US00RE35528E

United States Patent [19]

Matsuura et al.

[11] E Patent Number: Re. 35,528

[45] Reissued Date of Patent: Jun. 10, 1997

[54] IMAGE RECORDING APPARATUS HAVING A TONER SUPPLY TANK AND A TONER RECOVERY TANK CONFIGURED INTO A UNITARY, DISPOSABLE MAGAZINE

[75] Inventors: Yozo Matsuura, Machida; Shiroh Kondoh, Atsugi; Kazuhiro Yuasa, Zama; Hiroshi Saitoh, Avase; Hiroyuki Kiyoi, Sagamihara; Masanori Yoshimura, Isehara; Masahiro Kawabe; Yoshiya Itoh, both of Atsugi, all of Japan

[73] Assignee: Ricoh Company, Ltd., Tokyo, Japan

[21] Appl. No.: 269,452

[22] Filed: Jun. 30, 1994

Related U.S. Patent Documents

Reissue of:

[64] Patent No.: 5,126,799
Issued: Jun. 30, 1992
Appl. No.: 619,508
Filed: Nov. 29, 1990

[30] Foreign Application Priority Data

| | | | |
|---|---|---|---|
| Dec. 5, 1989 | [JP] | Japan | 1-314365 |
| Jun. 15, 1990 | [JP] | Japan | 2-155497 |
| Jun. 22, 1990 | [JP] | Japan | 2-162672 |
| Oct. 18, 1990 | [JP] | Japan | 2-277834 |

[51] Int. Cl.[6] ..... G03G 15/08

[52] U.S. Cl. ..... 399/358; 222/DIG. 1; 399/120; 399/262

[58] Field of Search ..... 355/298, 200, 355/260, 245, 210, 206, 209; 222/DIG. 1

[56] References Cited

U.S. PATENT DOCUMENTS

| | | | |
|---|---|---|---|
| Re. 33,484 | 12/1990 | Imanaka | 355/298 |
| Re. 34,384 | 9/1993 | Ishiguro et al. | 355/298 |
| 3,660,863 | 5/1972 | Gerbasi . | |
| 4,314,756 | 2/1982 | Amitani et al. . | |

(List continued on next page.)

FOREIGN PATENT DOCUMENTS

| | | |
|---|---|---|
| 0 176 207 | 4/1986 | European Pat. Off. . |
| 0 248 682 | 12/1987 | European Pat. Off. . |
| 0 249 928 | 12/1987 | European Pat. Off. . |
| 0 312 230 | 4/1989 | European Pat. Off. . |

(List continued on next page.)

OTHER PUBLICATIONS

Patent Abstracts of Japan, vol. 10, No. 101 (P-447)(2158), Apr. 17, 1986, JP 60-233678, Nov. 20, 1985, and patent pp. 5 and 6.

Patent Abstracts of Japan, vol. 8, No. 33 (P-254)(1470), Feb. 14, 1984, JP 58-189675, Nov. 5, 1983, and patent pp. 7,8,and 9.

(List continued on next page.)

*Primary Examiner*—Arthur T. Grimley
*Assistant Examiner*—T. A. Dang
*Attorney, Agent, or Firm*—Oblon, Spivak, McClelland, Maier & Neustadt, P.C.

[57] ABSTRACT

A xerographic image recording apparatus includes a photosensitive body moved along a circuitous path, an electric discharging unit for eliminating electric charges from the photosensitive body, a precharging unit for charging the photosensitive body electrically, an image writing unit for writing an image on the photosensitive body, an image developing unit for coating the photosensitive body by the toner to form a toner image on the photosensitive body; a recording sheet feeding unit for feeding a recording sheet along a sheet path, an image transfer unit for transferring the toner image onto a recording sheet, a cleaning unit for removing the toner remaining on the photosensitive body after the transfer of image on the recording sheet is completed, a toner supply tank for supplying the toner to the image developing unit, and a toner recovery tank for collecting the toner removed by the cleaning unit from the photosensitive body, wherein the toner supply tank and the toner recovery tank are assembled into a unitary body to form a detachable magazine.

29 Claims, 11 Drawing Sheets

U.S. PATENT DOCUMENTS

| | | | |
|---|---|---|---|
| 4,323,306 | 4/1982 | Ito et al. . | |
| 4,389,968 | 6/1983 | Satomura | 118/652 |
| 4,427,289 | 1/1984 | Oda . | |
| 4,469,434 | 9/1984 | Yamazaki et al. . | |
| 4,505,577 | 3/1985 | Koizumi . | |
| 4,523,834 | 6/1985 | Pelda et al. . | |
| 4,593,997 | 6/1986 | Fox et al. . | |
| 4,639,123 | 1/1987 | Adachi et al. . | |
| 4,660,960 | 4/1987 | Fukunaga et al. . | |
| 4,696,565 | 9/1987 | Imanaka | 355/200 |
| 4,697,914 | 10/1987 | Hauser . | |
| 4,708,455 | 11/1987 | Kubota et al. | 355/211 |
| 4,734,737 | 3/1988 | Koichi . | |
| 4,768,055 | 8/1988 | Takamatsu et al. | 355/200 |
| 4,768,062 | 8/1988 | Tanzawa et al. . | |
| 4,812,878 | 3/1989 | Kaieda . | |
| 4,816,877 | 3/1989 | Keen . | |
| 4,860,056 | 8/1989 | Kano et al. | 355/298 |
| 4,862,209 | 8/1989 | Sakamoto et al. . | |
| 4,862,212 | 8/1989 | Tanzawa et al. . | |
| 4,868,607 | 9/1989 | Folkins et al. . | |
| 4,873,549 | 10/1989 | Tada et al. | 355/206 |
| 4,888,620 | 12/1989 | Fujino et al. . | |
| 4,899,690 | 2/1990 | Hacknauer et al. | 118/653 |
| 4,908,661 | 3/1990 | Iwata et al. | 355/211 |
| 4,916,490 | 4/1990 | Tanaka et al. . | |
| 4,926,217 | 5/1990 | Bares . | |
| 4,931,838 | 6/1990 | Ban et al. . | |
| 4,947,211 | 8/1990 | Ono et al. . | |
| 4,947,216 | 8/1990 | Surti . | |
| 4,963,940 | 10/1990 | Nemoto et al. . | |
| 4,967,691 | 11/1990 | Chikama et al. . | |
| 4,989,045 | 1/1991 | Slayton et al. | 355/260 |
| 5,017,966 | 5/1991 | Suga . | |
| 5,036,363 | 7/1991 | Iida et al. . | |
| 5,070,368 | 12/1991 | Okano et al. . | |
| 5,075,726 | 12/1991 | Itaya et al. . | |
| 5,075,728 | 12/1991 | Kobayashi et al. . | |
| 5,081,504 | 1/1992 | Morisawa et al. . | |
| 5,084,739 | 1/1992 | Kalyandurg et al. . | |
| 5,095,331 | 3/1992 | Takano . | |
| 5,121,168 | 6/1992 | Aoki et al. . | |
| 5,126,799 | 6/1992 | Matsuura et al. . | |
| 5,134,960 | 8/1992 | Shirai . | |
| 5,139,176 | 8/1992 | Reindl et al. . | |

FOREIGN PATENT DOCUMENTS

| | | |
|---|---|---|
| 2 611 931 | 9/1988 | France . |
| 30 21 053 | 12/1981 | Germany . |
| 39 07 875 | 9/1989 | Germany . |
| 40 38 677 A1 | 6/1991 | Germany . |
| 40 38 677 | 6/1991 | Germany . |
| 52-6766 | 1/1977 | Japan . |
| 55-64266 | 5/1980 | Japan . |
| 58-202473 | 11/1983 | Japan . |
| 59-40677 | 3/1984 | Japan . |
| 60-235174 | 11/1985 | Japan . |
| 0208065 | 9/1986 | Japan . |
| 61-204670 | 9/1986 | Japan . |
| 61-279870 | 12/1986 | Japan . |
| 1-314279 | 12/1989 | Japan . |
| 3 139679 | 6/1991 | Japan . |
| 3-158886 | 7/1991 | Japan . |
| 4-116583 | 4/1992 | Japan . |
| 2 115 351 | 9/1983 | United Kingdom . |

OTHER PUBLICATIONS

Patent Abstracts of Japan, P–946, Oct. 18, 1989, vol. 13, No. 460, JP 1–179975, Jul. 18, 1989.

Patent Abstracts of Japan, P–942, Oct. 9, 1989, vol. 13, No. 448, JP 1–172885, Jul. 7, 1989.

Patent Abstracts of Japan, P–521, Nov. 28, 1986, vol. 10, No. 354, JP 61–151680, Jul. 10, 1986.

Patent Abstracts of Japan, P–1124, Oct. 30, 1990, vol. 14, No. 498, JP 2–203372, Aug. 13, 1990.

Patent Abstracts of Japan, P–558, Mar. 23, 1987, vol. 11, No. 91, JP 61 241777, Oct. 28, 1986.

Patent Abstracts of Japan, P–1250, Sep. 11, 1991, vol. 15/No. 360.

IMAGE RECORDING APPARATUS HAVING A TONER SUPPLY TANK AND A TONER RECOVERY TANK CONFIGURED INTO A UNITARY, DISPOSABLE MAGAZINE

Matter enclosed in heavy brackets [ ] appears in the original patent but forms no part of this reissue specification; matter printed in italics indicates the additions made by reissue.

BACKGROUND OF THE INVENTION

The present invention generally relates to image recording apparatuses for use in facsimiles, personal computers, copiers, and the like, and more particularly to a xerographic image recording apparatus having a toner recovery tank and a toner supply tank combined with each other to form a unitary, disposable magazine.

FIG. 1 shows a conventional xerographic image recording apparatus for recording an image on a recording sheet.

Referring to FIG. 1, the image recording apparatus comprises a photosensitive belt 1 driven along a circuitous path by a drive roller 2 in a direction indicated by an arrow. The photosensitive belt 1 is charged uniformly by a precharger unit 3 and is irradiated by an optical beam exiting from an exposure unit 4. The optical beam is produced by a laser device not illustrated as a laser beam in response to an image signal representing the image to be recorded and is deflected by a rotary polygonal mirror 5 forming a part of the exposure unit 4. The deflected laser beam is then passed through an optical system comprising a mirror and a cylindrical lens 6 and focused on the photosensitive belt 1. Thereby, an electrostatic latent image is formed on the photosensitive belt 1.

On the photosensitive belt 1 thus charged and formed with the electrostatic latent image, toner that is supplied from a toner tank 8 via a hopper mechanism 9 is coated by a development roller 7. Thereby the electrostatic latent image of the photosensitive belt 1 is developed. The hopper 9, the development roller 7 and other related parts form a developing unit 10.

Further, there is provided a sheet cartridge 11 wherein a number of recording sheets 12 cut into a predetermined size and shape are stacked. Upon the mounting of the cartridge 11 on the recording apparatus, the sheets 12 in the cartridge 11 are separated one by one from the stack by a feed roller 14 and a separator roller 15, and the sheet thus separated is passed along a path for recording the image. The feeding of each of the sheets is controlled by a pair of register rollers 16 that supply the sheet in synchronization with the feeding of the photosensitive belt 1 such that the developed toner image on the photosensitive belt 1 is transferred to the sheet at a predetermined position.

In order to transfer the toner image on the photosensitive belt 1 to each of the recording sheets, there is provided a transfer charger 17, and the sheet thus transferred with the toner image is then passed through a fixing unit 18 that has a heating element therein and comprises a pair of cooperating rollers. Thereby, the image transferred on the sheet is fixed and the recording of the image on the recording sheet is completed. Each of the recording sheets 12 is then discharged on a tray 21 by a discharge roller 19.

After the transfer of the toner image is completed, the photosensitive belt 1 is subjected to a cleaning process wherein a cleaning blade 22, which comes in contact with the photosensitive belt 1, removes any remaining toner on the photosensitive belt 1. The toner thus removed from the photosensitive belt 1 falls into a toner recovery tank 23. The cleaning blade 22 and the toner recovery tank 23 form a cleaning unit.

The photosensitive belt 1 thus subjected to the cleaning process is then passed through an electrostatic discharge station 24 that is formed from a lamp, and the electric charges remaining on the belt 1 are removed by irradiating light thereon. Thereby, the belt 1 is ready for the next recording operation.

In this conventional example, the exposure unit 4, the precharger unit 3, the electrostatic discharge station 24, the photosensitive belt 1, the feed rollers cooperating therewith, and other cooperating units such as the cleaning unit 20, are assembled to form a rotatable upper unit of the recording apparatus such that the upper unit is rotatable with respect to a lower fixed unit of the recording apparatus, about a pivot 25. Thus, when one of the sheets 12 becomes jammed in the sheet feeding path, the user can open the recording apparatus by opening the rotatable upper unit and remove the sheet that is causing the jam.

In such a conventional xerographic image recording apparatus, the lifetime of the photosensitive belt and the developing unit has reached a length of about several tens of thousands of hours when the standard A4 size sheet is used for recording. On the other hand, the toner in the toner supply tank cannot last such a long time because of the limited capacity of the toner supply tank. Because of the need to reduce the size of the recording apparatus, the size of the toner supply tank is limited. The same holds true for the toner recovery tank. Thus, the user of the recording apparatus has to replace the toner supply tank 8 and the toner recovery tank 23 frequently.

In the foregoing conventional recording apparatus, the toner recovery tank 23 and the toner supply tank 8 are provided separately, and because of this, they have to be separately replaced. Thus, the user is alerted to monitor the state of the toner supply tank 8 and the toner recovery tank 23 constantly, and when it is detected that either the toner supply tank 8 is empty or the toner recovery tank 23 is full, the tank is replaced. For this purpose, there is provided a toner sensor 26 in the hopper mechanism 9, as shown in FIG. 2, for detecting the existence of the toner supplied from the tank 8 for recording the image. Further, there is provided a toner sensor 27 in the toner recovery tank 23 for detecting when the collected toner has filled the toner recovery tank 23. Typically, a piezoelectric sensor is employed for each of the sensors 26 and 27 such that the piezoelectric sensor detects the dilatation or contraction of a rubber membrane 28 or 29 caused in response to the toner in the tank. The bar 30 in FIG. 2 is employed for stirring the tone in the tank 8.

Anyway, the user has to replace the tank 8 and the tank 23 separately at different times during use of the image recording apparatus and such a replacement operation is significantly troublesome for the user of the recording apparatus.

Although there is known a recording apparatus wherein the photosensitive body, the developing unit, the toner supply tank and the toner recovery tank are assembled as a unitary, disposable body, such an apparatus wastes resources as the still usable photosensitive body and the developing unit are disposed of upon the toner supply tank being replaced. As a result of this, the cost of the recording apparatus, including the operating cost, is inevitably increased. Further, the proposal of the photosensitive body causes contamination of the environment.

SUMMARY OF THE INVENTION

Accordingly, it is a general object of the present invention to provide a novel and useful xerographic image recording apparatus wherein the aforementioned problems are eliminated.

Another and more specific object of the present invention is to provide a xerographic image recording apparatus wherein a toner supply tank and a toner recovery tank are combined together with a cleaning unit to form a unitary, disposable body. According to the present invention, the toner supply tank and the toner recovery tank are replaced simultaneously by a simple procedure of replacing the magazine. Thereby, the maintenance operation that has to be performed by the use is significantly simplified. Further, the running cost of the recording apparatus for each recording sheet is significantly reduced. Further, it is possible to omit the toner sensor of the recovery tank in the recording apparatus of the present invention. Thereby, the cost of the recording apparatus itself is reduced. Furthermore, the present invention eliminates the formation of toxic industrial waste by minimizing the occasion of disposing the used photosensitive body.

Other objects and further features of the present invention will become apparent from the following detailed description when read in conjunction with the attached drawings.

DETAILED DESCRIPTION

Figure 1:
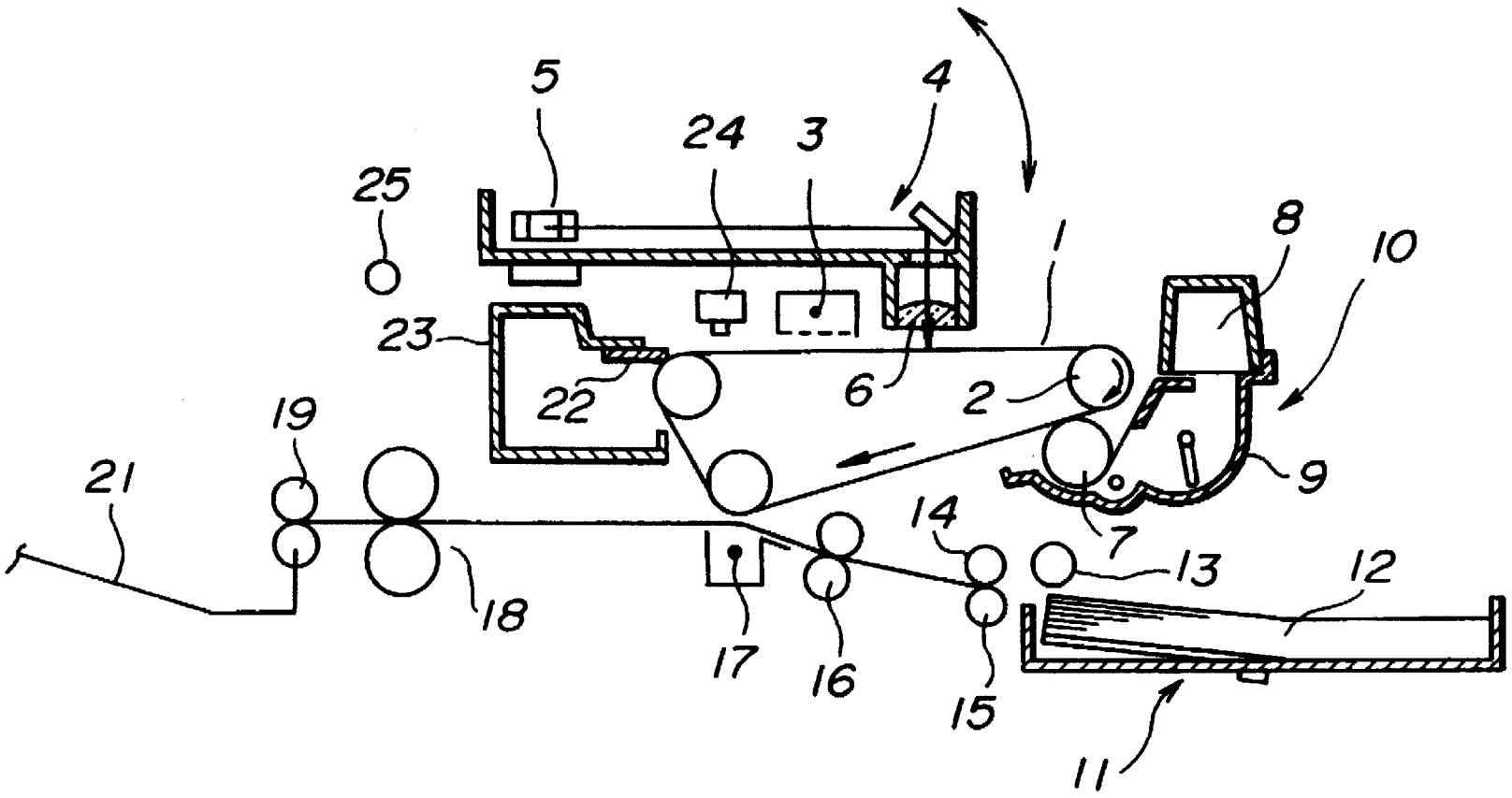
FIG. 1 PRIOR ART
FIG. 1 is a diagram showing schematically the construction of a conventional xerographic image recording apparatus.
Figure 2:
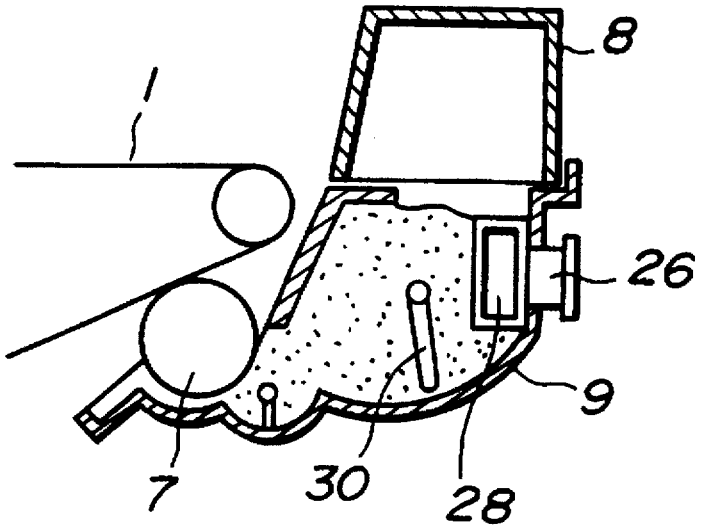
FIG. 2 PRIOR ART
FIG. 2 is a diagram showing a conventional toner supply tank used in the apparatus of FIG. 1.
Figure 3:
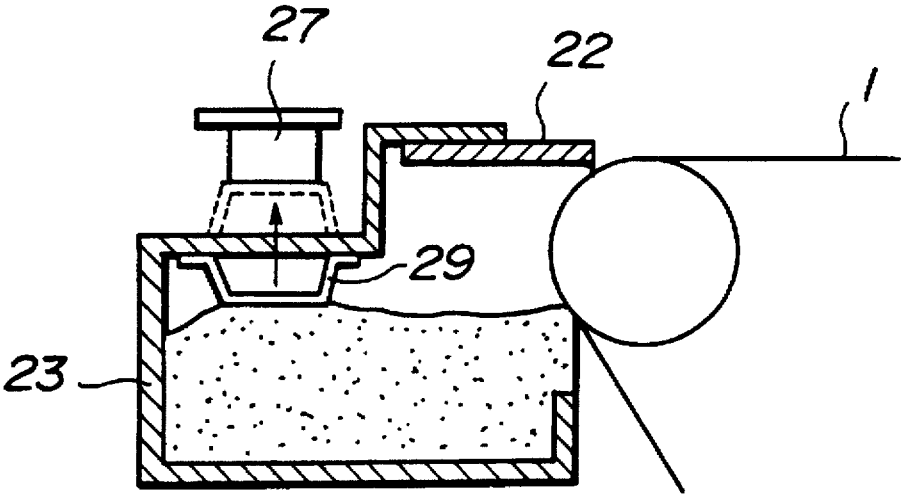
FIG. 3 PRIOR ART
FIG. 3 is a diagram showing a conventional toner recovery tank used in the apparatus of FIG. 1.

Hereinafter, the xerographic image recording apparatus of the present invention will be described with reference to the drawings. In the drawings, those parts that have already been described with reference to FIGS. 1–3 are given identical reference numerals and the description thereof will be omitted.

Figure 4:
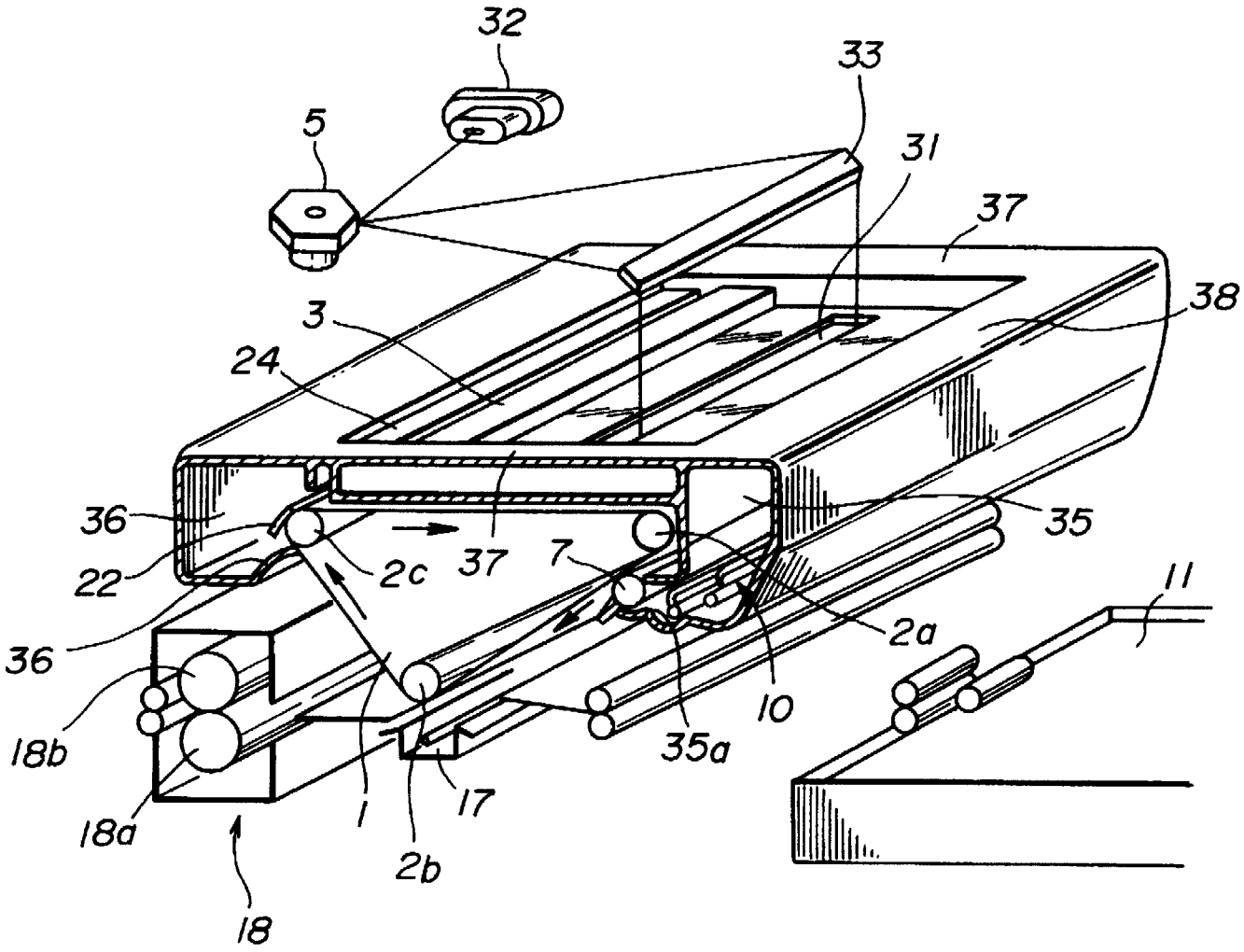
FIG. 4 is a diagram showing a xerographic image recording apparatus according to a first embodiment of the present invention.

FIG. 4 shows a first embodiment of the present invention, wherein the photosensitive belt 1 is provided to move in the direction of an arrow in FIG. 4 along a circuitous path defined by rollers 2a, 2b and 2c. Along the path of the photosensitive belt 1, there is provided the precharger 3 for charging the photosensitive belt 1 uniformly before the writing of the image thereon.

The writing of the image on the photosensitive belt 1 is performed by an image writing unit 31 including a laser source 32 for producing a laser beam and the polygonal mirror for deflecting the laser beam. The deflected laser beam hits the electrically charged photosensitive belt 1 and forms an electrostatic latent image thereon. As the principle for forming the electrostatic latent image of a photosensitive body is well known, further description thereof will be omitted.

The electrostatic latent image thus formed on the photosensitive belt 1 is then developed by the developing unit 10 which includes the development roller 7 for coating the photosensitive belt 1 with the toner. In order to supply the toner to the developing unit 10, there is provided a toner supply tank 35 provided with an outlet opening 35a in registration with the development roller 7 for supplying the toner in the tank 35 therethrough. Thereby, a toner image is developed on the photosensitive belt 1. The toner image on the photosensitive belt 1 is then transferred to a recording sheet that is supplied one by one from the cartridge 11 by the transfer charger 17. The transferred toner image on the recording sheet is then fixed by the fixing unit 18 which heats the toner for fixing. The fixing unit 18 includes a pair of rollers 18a and 18b, wherein a heating element is incorporated in one or both of the rollers 18a and 18b.

The recording sheet thus recorded with the image is then discharged from the recording apparatus by the action of the sheet discharging roller 19 (not illustrated in FIG. 4, see FIG. 1). On the other hand, the toner that remains on the photosensitive belt 1 is removed by the cleaning blade 22 and collected in a toner recovery tank 36 as waste toner. The cleaning blade 22 is provided adjacent to the roller 2c to come in contact with the photosensitive belt 1 that is guided around the roller 2c, and an opening 36a is provided in the toner recovery tank 36 in registration with the cleaning blade 22. Thereby, any residual toner removed from the photosensitive belt 1 is collected into the tank 36 from the opening 36a.

The photosensitive belt 1 thus cleaned is discharged electrically by irradiating a light thereon. Thereby, the apparatus is ready for the recording of the next image.

In the present embodiment, the toner supply tank 35 and the toner recovery tank 36 are disposed at both sides of a part of the apparatus wherein the discharge part 24, the precharger 3 and the image writing unit 31 are provided. Further, there is provided a connection member 37 that connects the toner supply tank 35 and the toner recovery tank 36 so as to form a unitary body as shown in FIG. 4 which is a detachable, disposable magazine 38. In other words, the toner supply tank 35 and the toner recovery tank 36 are so disposed outside the circuitous path of the photosensitive belt 1 that the toner supply tank 35 is located at one side of the circuitous path and the toner recovery tank 36 is located at the other side of the circuitous path of the photosensitive belt 1, the toner supply tank 35 and the toner recovery tank 36 being connected by the connection member 37 that extends across the circuitous path of the photosensitive belt 1.

In the present embodiment, the toner recovery tank 36 collects a predetermined amount of toner when the toner supply tank 35 becomes empty. Thus, the respective replacements of the toner recovery tank 36 and the toner supply tank 35 with respective new tanks are performed at the same time. These respective replacement of the toner supply tank 35 and the toner recovery tank 36 can be performed simultaneously by replacing the magazine 38 with a new one. Thereby, the necessity of separately monitoring the amount of toner in the tanks 35 and 36 separately is eliminated and thus the toner can be replenished in a significantly simplified way. Further, by designing the tanks 35 and 36 so that the tank 36 becomes full when the tank 35 becomes empty. the sensor for detecting whether the tank 36 is full or not can be omitted from the present embodiment without causing problem. Furthermore, the present embodiment reduces the operating cost, as the expensive photosensitive belt 1 is not discarded when the magazine 38 is exchanged. Furthermore, contamination of the environment can be minimized as the photosensitive belt 1 can be used until the end of its lifetime.

Next, a second embodiment of the xerographic image recording apparatus of the present invention will be described with reference to FIG. 5. In the drawing, those parts that correspond to the parts already described are given identical reference numerals and the description thereof will be omitted.

Figure 5:
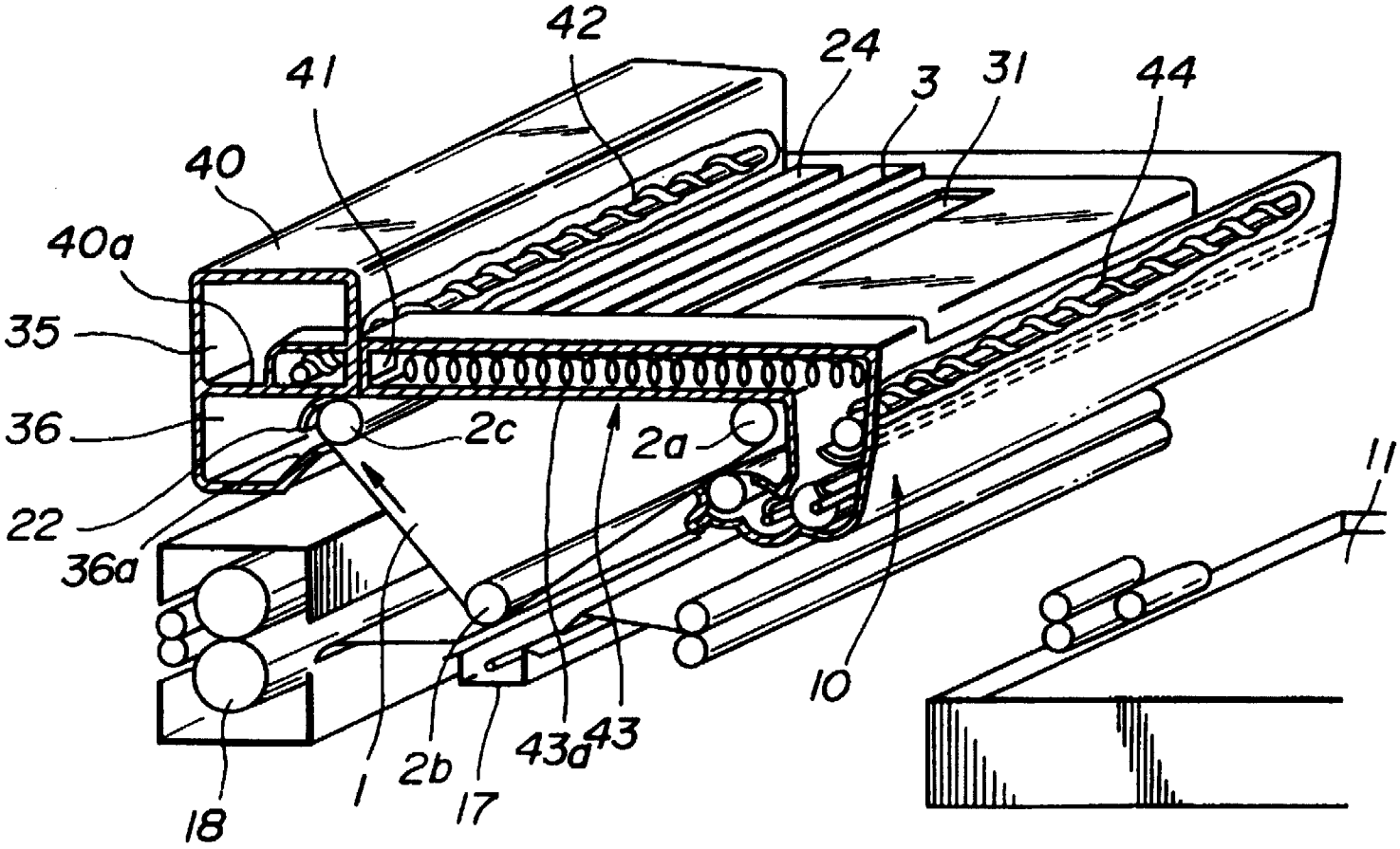
FIG. 5 is a diagram showing a xerographic image recording apparatus according to a second embodiment of the present invention.

Referring to FIG. 5, the recording apparatus of the present embodiment uses a magazine 40 in place of the magazine 38 wherein the toner supply tank 35 and the toner recovery tank 36 are assembled not only in a unitary body but also adjacent to each other. In other words, the toner supply tank 35 and the toner recovery tank 36 form compartments in the magazine 40 separated from each other by a common compartment wall 40a. The magazine 40 is mounted on the recording apparatus s that the toner supply tank 35 and the toner recovery tank 36 are both located adjacent to the drive roller 2c. In this mounted state, the drive roller 2c and the cleaning blade 22 adjacent thereto are accommodated in the opening 36a formed in the toner recovery tank 36, and the toner that is removed from the photosensitive belt 1 by the cleaning blade 22 falls into the toner recovery tank 36 due to the gravity. *The opening 36a corresponds to an inlet for the toner recovery tank 36.* The magazine 40 as constructed above has a reduced size and can be easily handled or transported as compared to the magazine 38 of the first embodiment.

In order to supply the toner from the toner supply tank 35 to the developing unit 10, which in this embodiment is now separated from the former, a toner transport path 43 is so provided that the toner transport path 43 extends from the magazine 40 to the developing unit 10. At the part of the magazine 40 which the toner transport path 43 engages with, there is provided a corresponding opening 41 for discharging the toner therethrough, *the opening 41 constituting both an outlet for the toner supply tank 35 and an inlet for the developing unit 10.* The toner transport path 43 is a unitary body which comprises a tubular member extending from the developing unit 10 and accommodating therein a screw feeding mechanism 43a. Further, another toner transport mechanism 42 is provided within the toner supply tank 35 and thus within the magazine 40 for feeding the toner in the tank 35 to the opening 41. Furthermore, there is provided still another toner transport mechanism 44 inside the developing unit 10 for distributing uniformly the toner supplied through the path 43 in the lateral direction or the horizontal scanning direction of the photosensitive belt 1. The toner transport mechanism 42 or 43 may be a screw feeder used commonly for transporting powder material. In the present embodiment, it is preferred that a shutter mechanism for closing the opening 41 and another shutter mechanism for closing the opening 36a that matingly corresponds to the cleaning blade 22 be provided. The shutter mechanism will b described later with reference to another embodiment.

Figure 6:
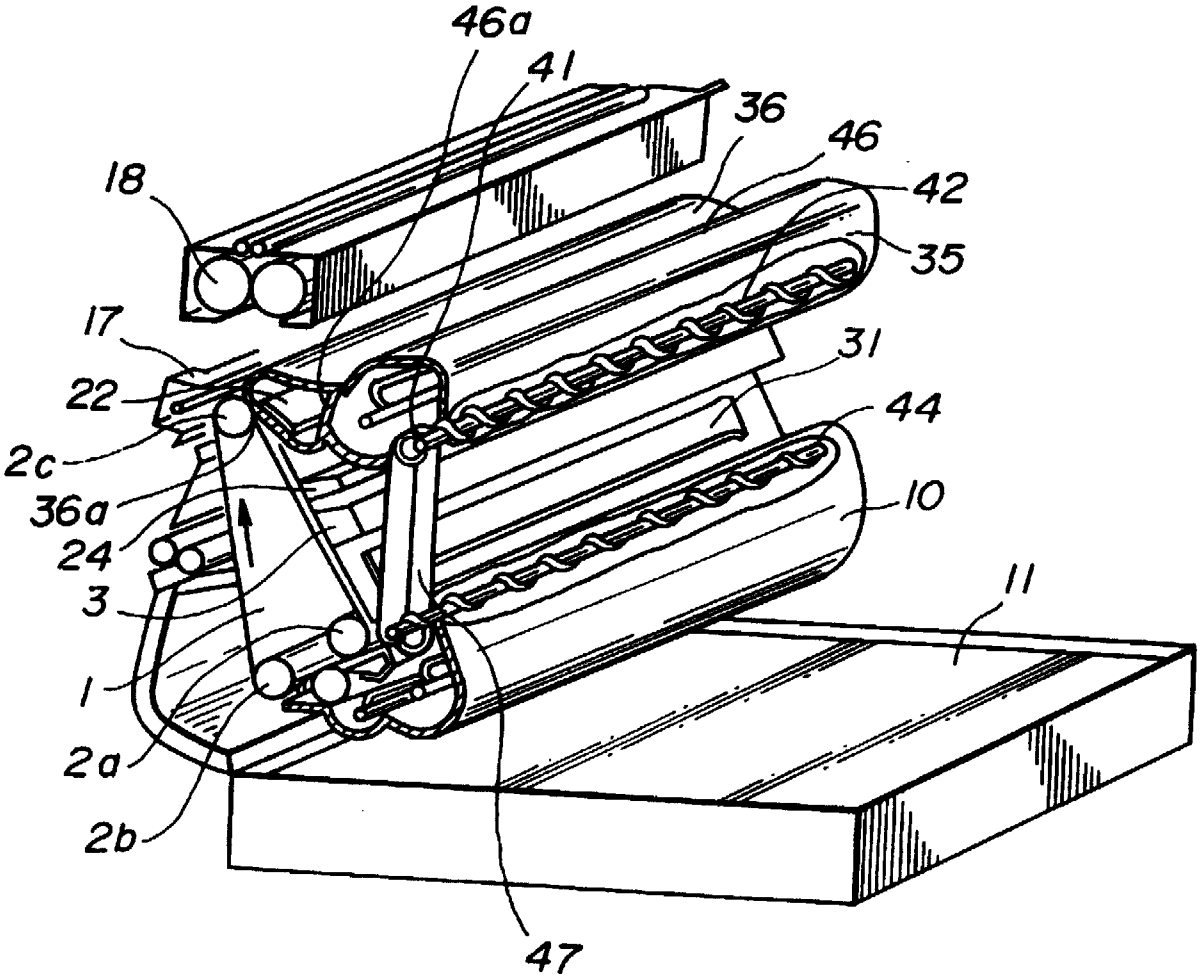
FIG. 6 is a diagram showing a xerographic image recording apparatus according to a third embodiment of the present invention.

FIG. 6 shows a third embodiment of the present invention, wherein the image recording apparatus of the present embodiment uses a disposable, detachable magazine 46 formed of the toner supply tank 35 and the toner recovery tank 36 assembled in a unitary body and adjacent to each other. Similar to the case of the magazine 40 the tank 35 and the tank 36 form adjacent compartments in the magazine 46 separated from each other by a common compartment wall 46a. The magazine 46 is so formed that, upon mounting on the image recording apparatus, the toner supply tank 35 is located immediately above the developing unit 10, and the feeding of the toner from the toner supply tank 35 to the developing unit 10 is made via a duct 47 extending generally vertically from the opening 41 of the toner supply tank 35 to the developing unit 10. In order to transport the toner in the toner supply tank 35 to the opening 41, the toner supply tank 35 is provided with a toner transport mechanism 42 similar to the that of the second embodiment. Further, in order to distribute the supplied toner uniformly over the developing unit 10, the toner transport mechanism 44 similar to the former embodiment is provided.

The magazine 46 is so mounted that the opening 36a on the toner recovery tank 36 matingly engages with the drive roller 2c and the cleaning blade 22 cooperating therewith and most of the tank 36 is located below the level of the cleaning blade 22. Thereby, the toner that is removed from the photosensitive belt 1 falls into the tank 3 due to the gravity. It should be noted that, in order to allow the toner which has been removed from the photosensitive belt 1 by the cleaning blade 22 to fall into the tank 36, it is necessary to provide the drive roller 2c at the highest position in the circuitous path of the photosensitive belt 1.

Figure 7:
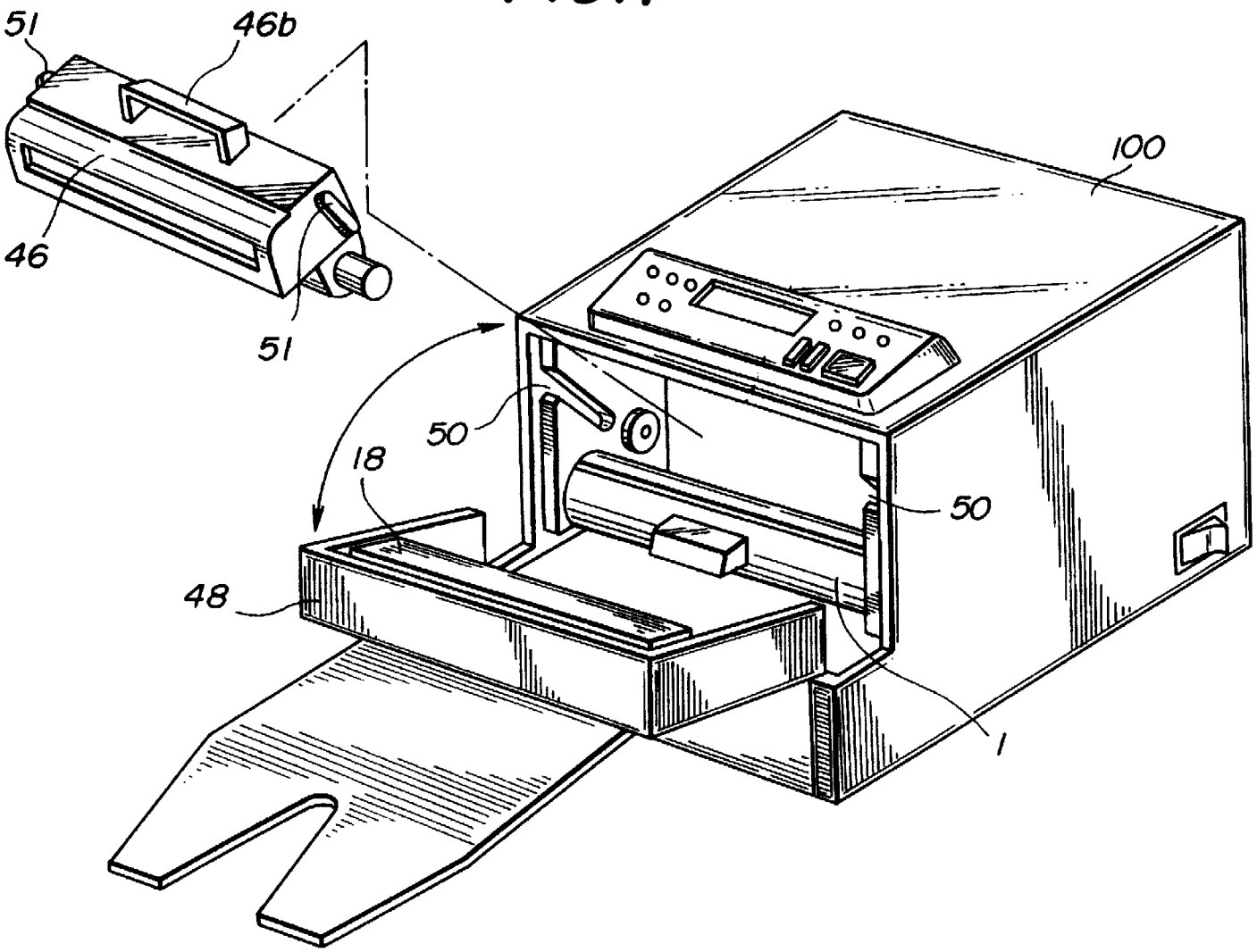
FIG. 7 is a diagram showing a mechanism for mountings disposable magazine on and dismounting the same from the xerographic image recording apparatus of FIG. 6.

FIG. 7 shows the operation for mounting the magazine 46 on the image recording apparatus.

Referring to FIG. 7, the image recording apparatus comprises a cover lid 48 that is held rotatably on a body 100 of the image recording apparatus. This cover lid 48 is provided on the side of the body 100 from which the sheet is discharged.

As can be seen in FIG. 7, which shows the state in which the cover lid 48 is opened, a pair of guide grooves 50 in the opposing inner side walls of the body 100 are so provided that each guide groove 50 extends toward the interior of the body 100. On the magazine 46, there are provided corresponding ledges 51 such that the magazine 46 is inserted into the space in the body obliquely in the downward direction along the guide grooves 50. Upon the closure of the cover lid 48, the fixing unit 18 is located above the magazine 46 as shown in FIG. 6.

Figure 8:
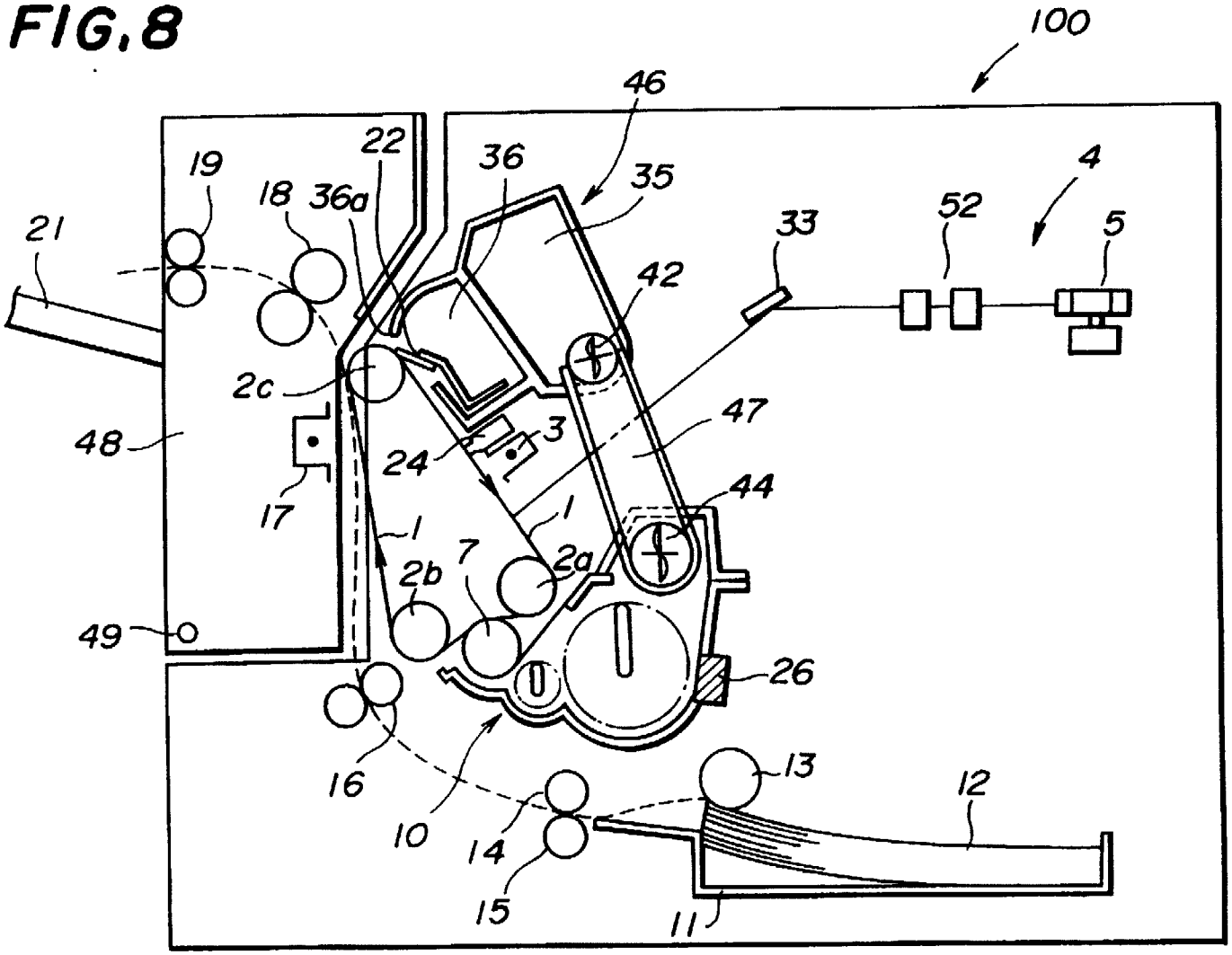
FIG. 8 is a diagram showing the interior of the image recording apparatus of FIG. 6 in the state where the disposable magazine is mounted.

FIG. 8 shows the inside of the body 100 of the image recording apparatus in the state that the magazine 46 is mounted. This drawing shows the path of the recording sheet and the optical system forming the recording unit together with the magazine 46 and the developing unit 10.

Referring to FIG. 8, the recording sheet is picked up from the stack 12 in the cartridge 11 by the pickup roller 13 and fed along the sheet path shown by the broken line one by one by the feed roller 14 and the separation roller 15. Further, under the control of the regist roller 16, the sheet is fed further to make a contact with the photosensitive belt 1 that is formed with a toner image thereon. Upon passing by the transfer charger 17, the toner image on the photosensitive belt 1 is transferred to the recording sheet and the toner image thus transferred is fixed thereon upon passage of the recording sheet through the fixing unit 18. After the fixing, the sheet is discharged from the body 100 of the image recording apparatus to the sheet tray 21 by the discharge roller 19.

The toner image is formed on the photosensitive belt 1 at first by charging the photosensitive belt 1 uniformly by the precharging unit 3. The photosensitive belt 1 is transported by the drive rollers 2a–2c along a circuitous path, wherein the drive roller 2c is provided at the highest level of the circuitous path as already described. The drive roller 2a drives the belt 1 toward the drive roller 2b, the drive roller 2b drives the belt 1 toward the drive roller 2c, and the drive roller 2c drives the belt 1 toward the drive roller 2a.

Next, the electrostatic latent image is formed on the photosensitive belt 1 thus charged by scanning the laser beam by the polygonal mirror 5. The laser beam thus scanned is directed to the photosensitive belt 1 by the lens system 52 and mirror 33. In the developing unit 10, the toner supplied from the toner supply tank 35 is coated on the photosensitive belt 1 carrying the electrostatic latent image thereon by the development roller 7, and the toner image thus formed on the photosensitive belt 1 is transferred to the recording sheet as already described. After the transfer of the toner image, any residual toner on the photosensitive belt 1 is cleaned off by the cleaning blade 22 cooperating with the drive roller 2c, and the removed toner falls into the toner recovery tank 36 through the opening 36a. After the removal of the residual toner, the photosensitive belt 1 is fed toward the drive roll 2a. Thereby, the photosensitive belt 1 is discharged by the discharging unit 24 before being charged again by the charging unit 3. Upon charging of the photosensitive belt 1 again by the charging unit 3, the next procedure for writing the image on the photosensitive belt 1 is ready to start.

As already described, the magazine 46 is provided above the developing unit 10. Thereby, the recovery tank 36 in the magazine 46 is located close to the drive roller 2c for collecting the removed toner into the tank 36. Further, the toner is supplied from the toner supply tank 35 located above the developing unit 10 via the duct 47 by the action of the gravity. In the present embodiment, the amount of toner is detected by the sensor 26 that is provided on the image developing unit 10. Thus, when it is detected by the sensor 26 that no toner is supplied to the image developing unit 10, this indicates that the toner supply tank 35 is empty and simultaneously the toner recovery tank 36 is full.

According to the present invention, the toner transport mechanism for feeding the toner from the tank 35 to the developing unit 1 is eliminated. Simultaneously, the sensor for detecting the toner in the toner recovery tank 36 is eliminated. Thereby, the construction of the image recording apparatus is simplified.

Figure 9:
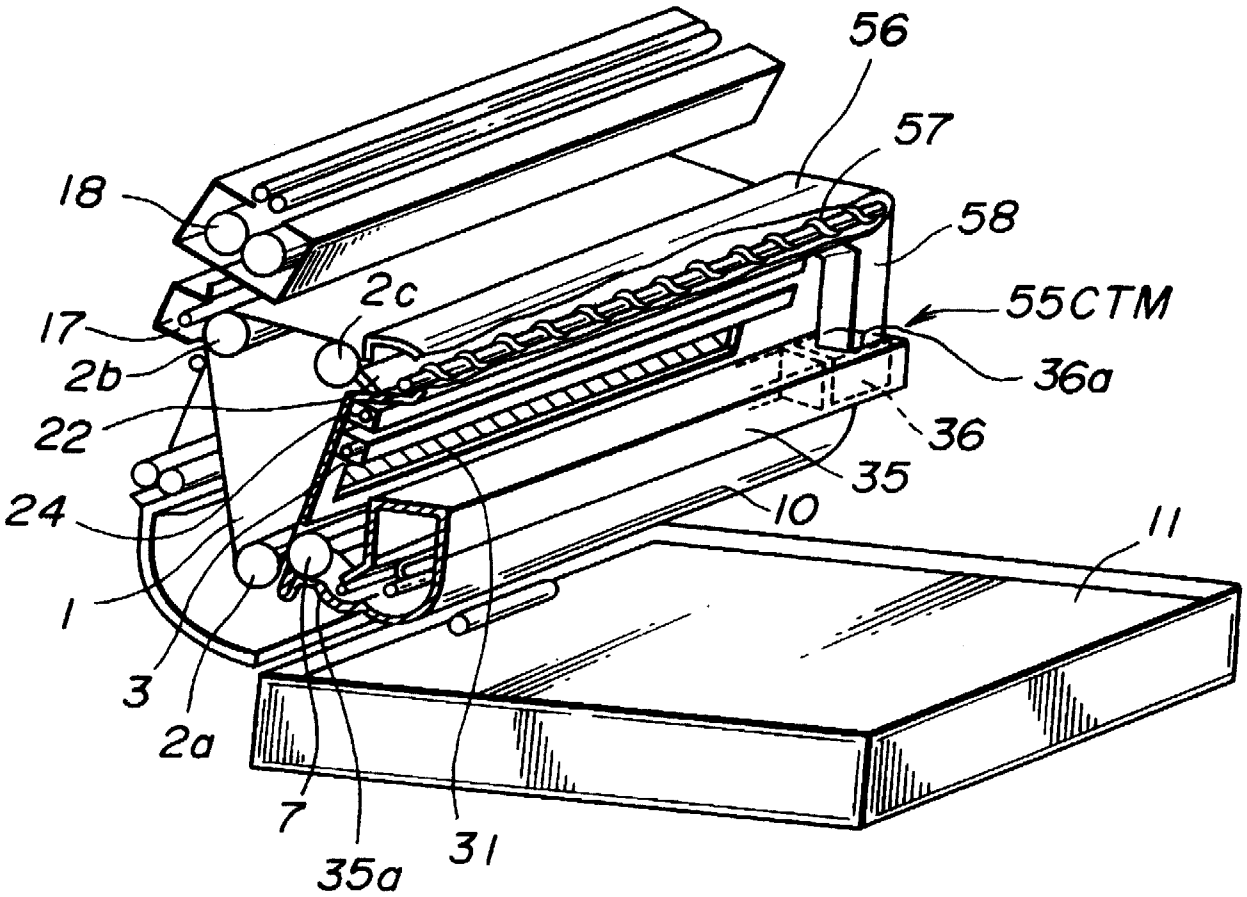
FIG. 9 is a diagram showing a xerographic image recording apparatus according to a fourth embodiment of the present invention.

Next, a fourth embodiment of the present invention will be described with reference to FIG. 9. In the drawing, those parts corresponding to the parts already described are given identical reference numerals and the description thereof will be omitted.

In the present embodiment, a magazine 55 is employed wherein the toner supply tank 35 and the toner recovery tank 36 are assembled adjacent with each other to form a unitary body similarly to the magazine 40 or 46, except that the toner recovery tank 36 is located above the toner supply tank 35. The magazine 55 is mounted such that the toner supply tank 35 is located adjacent to the developing unit 10. Thereby, the roller 7 of the developing unit 10 is accepted in the opening 35a of the tank 35 and the toner is supplied directly from the tank 35 to the roller 7. On the other hand, in order to collect the used toner that is removed from the photosensitive belt 1 into the toner recovery tank 36, there is provided a toner transport mechanism 57 adjacent to the cleaning blade 22.

In the present embodiment, the cleaning blade 22 is accommodated in an enclosure 56 forming a cleaning unit, and the toner transport mechanism 57 is accommodated in the enclosure 56. The toner transport mechanism 57 may comprise a screw feeder. From the enclosure 56, there extends a duct 58 generally in the vertical direction toward the toner recovery tank 36, and engages with the opening 36a formed in the tank 36 in correspondence to the duct 58. Thus, the waste donor is collected into the tank 36 even when the tank 36 is separated from the cleaning blade 22. Thereby, the user of the apparatus can replace the toner supply tank 35 and the toner recovery tank 36 simultaneously in a simple process. Further, the mechanism of the image recording apparatus can be simplified by eliminating the toner transport mechanism for transporting the toner from the toner supply tank 35 to the developing unit 10.

Figure 10:
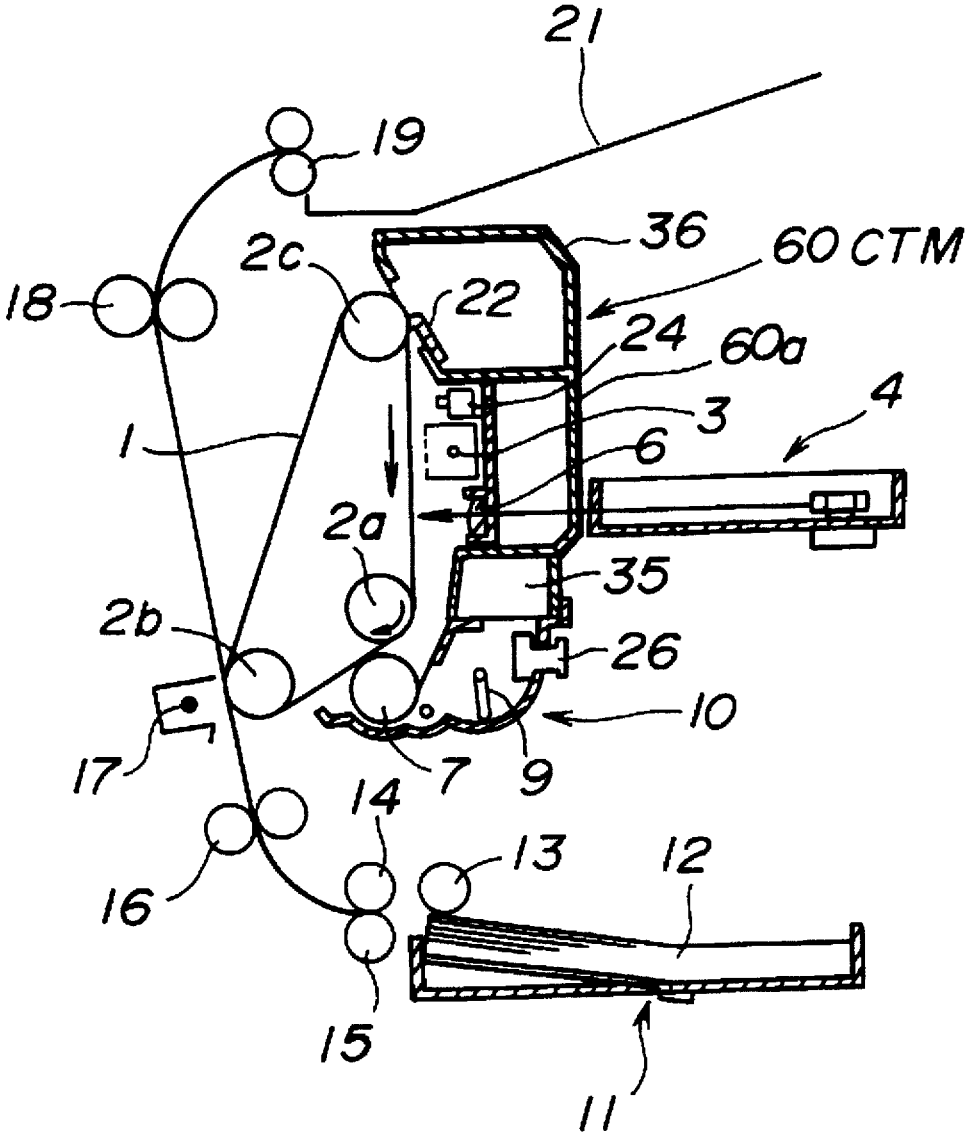
FIG. 10 is a diagram showing a xerographic image recording apparatus according to a fifth embodiment of the present invention.

FIG. 10 shows a fifth embodiment of the present invention. In FIG. 10, those parts corresponding to the parts already described are given identical reference numerals and the description thereof will be omitted.

In the present embodiment, the toner supply tank 35 and the toner recovery tank 36 are assembled to form a unitary disposable magazine 60, wherein the tank 35 and the tank 36 are connected as a unitary body by an intervening connecting member 60a. The connecting member 60a may be a hollow member as illustrated and there is provided an optical path for passing the laser beam produced by the exposure unit 4 to the photosensitive belt 1.

The magazine 60 is mounted vertically on the image recording apparatus in a state such that the toner recovery tank 36 is located at the top and the toner supply tank 35 is located at the bottom. Further, in the mounted state, the tank 35 is located immediately above the image developing unit 10.

In correspondence to the toner recovery tank 36, the drive roller 2c is disposed at the highest level for collecting the toner removed from the photosensitive belt 1 by the cleaning blade 22 into the tank 36. Further, the drive roller 2a is disposed immediately below the drive roller 2c, and the photosensitive belt 1 is coated with the toner after the photosensitive belt 1 has passed through the drive roller 2a. It should be noted that the toner is supplied to the roller 7 of the image developing unit 10 from the tank 35 that is located immediately above the unit 10.

The recording sheet is fed from the sheet stack 12 in the cartridge 11 located below the image developing unit 10 by the pickup roller 13, the feed roller 14 and the separation roller 15, and is supplied to the transfer charger 17 in synchronization with the movement of the photosensitive belt 1 under control of the regist roller 16. After the transfer of the toner image to the recording sheet in the transfer charger 17, the recording sheet is passed through the fixing unit 18 and is discharged to the tray 21 by the discharge roller 19.

In this embodiment, it should be noted that the laser beam hits the photosensitive belt 1 at the part or area thereof located between the roller 2c and the roller 2a. The laser beam is passed through the connecting member 60a along the optical path provided therein, and in order to focus the optical beam on the photosensitive belt 1, a cylindrical plastic lens 6 is provided on the connecting member as a unitary body. Of course, this lens 6 may be provided separately from the magazine 60. When replacing the magazine 60, the user pulls the magazine 60 in a direction substantially perpendicular to the plane of FIG. 10 for removal.

Similarly to the case of the embodiment of FIG. 8, the present embodiment employs the sensor 26 provided on the image developing unit 10 as the only sensor for detecting the existence or absence of the toner that is available in the tank 35. In other words, there is no sensor provided on the magazine 60 that is discarded after the use. Further, when the lens 6 is provided unitary to the magazine 60, the lens 6 is replaced with a new one upon the replacement of the magazine 60. Thereby, the degradation in the optical property of the lens 6 and thus the degradation in the quality of recording due to the deposition of toner during the use of the recording apparatus is effectively prevented.

Figure 11:
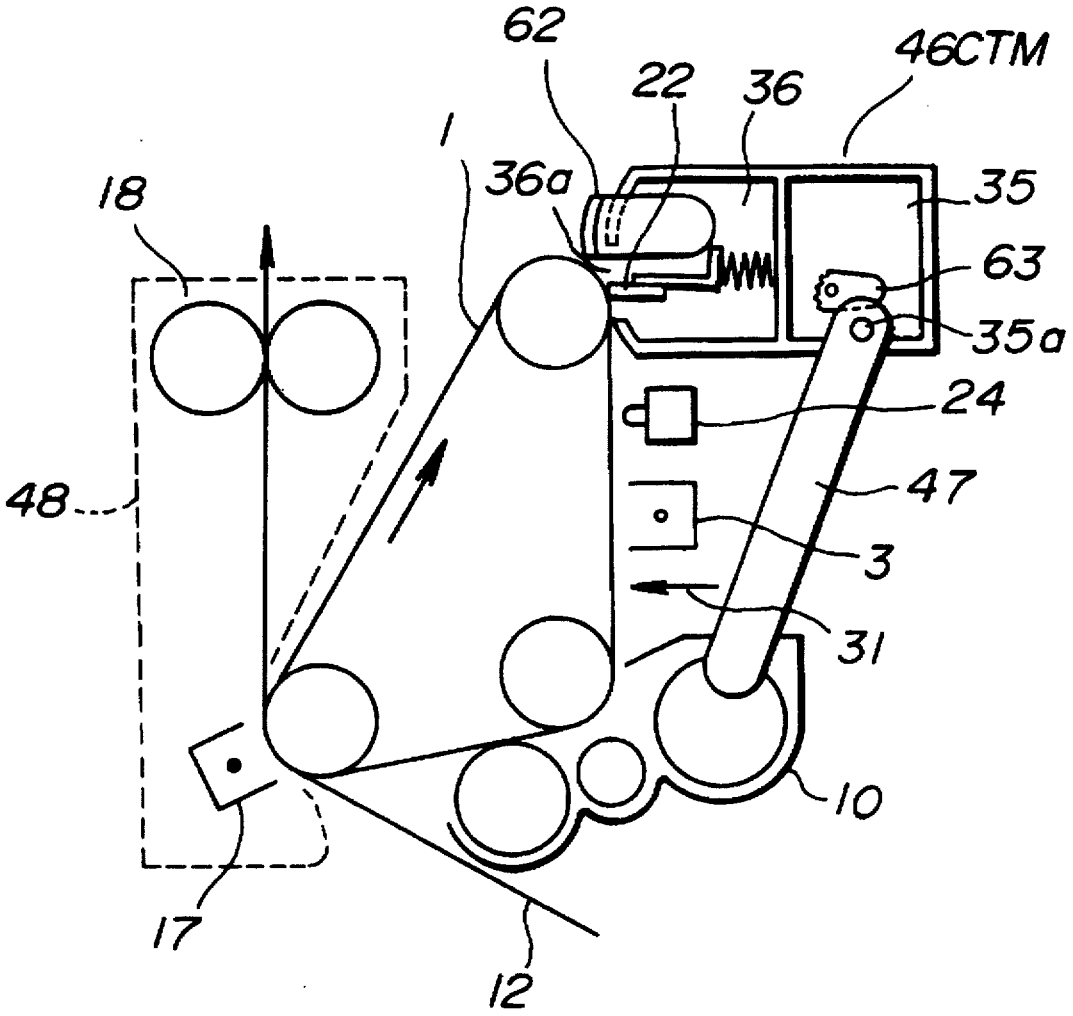
FIG. 11 is a diagram showing a xerographic image recording apparatus according to a sixth embodiment of the present invention.

Next, a sixth embodiment of the present invention will be described with reference to FIG. 11. In FIG. 11, those parts that have been described already are given identical reference numerals and the description thereof will be omitted.

Referring to FIG. 11, the present embodiment is a modification of the third embodiment (FIGS. 6–8) and uses the disposable magazine 46. In the present embodiment, there is provided a shutter 62 at the opening 35a of the tank 35 and a shutter 63 at the opening 36a of the tank 36 for preventing spill of the toner at the time of replacement of the magazine. Thus, the shutter 62 and the shutter 63 are designed to close the corresponding openings of the tank 35 and the tank 36 when the magazine 46 is detached from the image recording apparatus.

Figure 12:
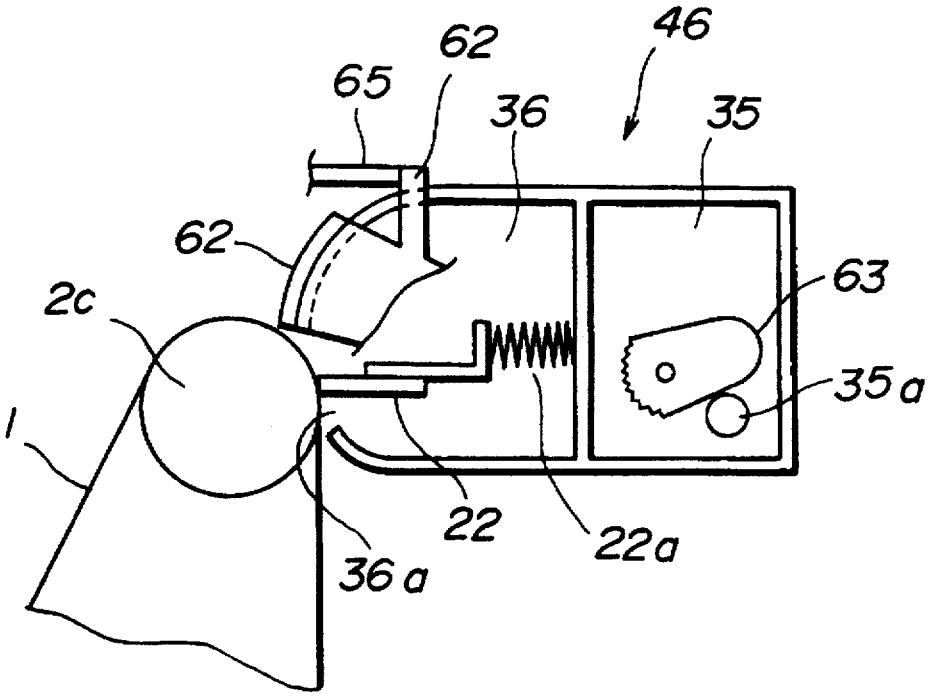
FIGS. 12 and 13 are diagrams showing a shutter mechanism used in the disposable magazine that is in turn used in the apparatus of FIG. 8.
Figure 13:
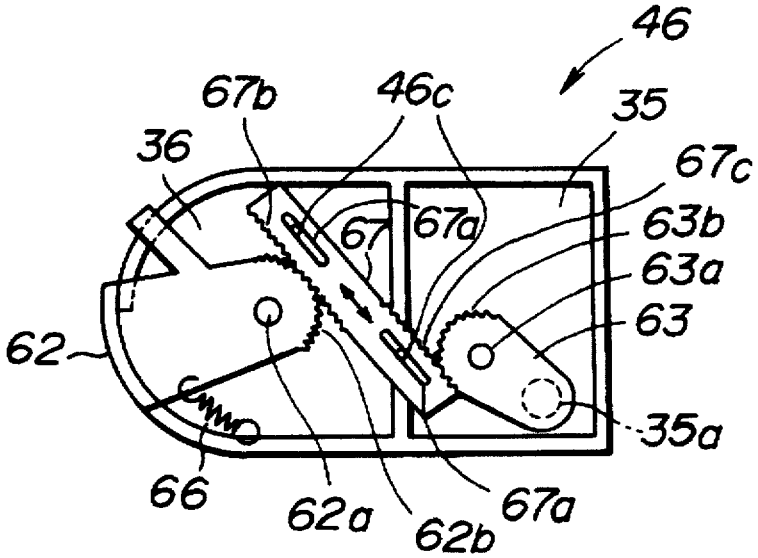

Next, the mechanism for opening and closing the shutters 62 and 63 will be described with reference to FIGS. 12 and 13, wherein FIG. 12 shows the state in which the shutters 62 and 63 are opened and FIG. 13 shows the state in which the shutters 62 and 63 are closed.

Referring to the state of FIG. 12 at first, the shutter 62 is opened by the action of a pin 65 that is provided on the cover lid 48 and pushes a lever member 62a provided on the shutter 62 in the right direction in the drawing. Further, the shutter 63 is opened in correspondence to the opened state of the shutter 62 by a mechanism that will be described with reference to FIG. 13.

When the cover lid 48 is opened as shown in the state of FIG. 7, the pin 65 moved backward toward the left in the drawing, and the shutter 62 is closed by the urging force exerted by a spring 66. The shutter 62 is held rotatably about a pin 62a and has a toothed part 62b at a part thereof as shown in FIG. 13. Further, there is provided a slidable member 67 that is held on the magazine 46 by a pin 46c. It should be noted that the pin 46c is accepted in an elongated groove 67a formed in the slidable member 67 and the member 67 is movable in the direction as indicated by arrows in the drawing. On a side of the member 67 that makes a contact with the toothed part 62b of the shutter 62, there is provided a corresponding toothed part 67b, and the slidable member 67 is moved toward the upper left direction upon the movement of the shutter 62 in the counter clockwise direction about the pin 62a. On the other hand, when the shutter 62 is moved in the clockwise direction, the slidable member 67 is moved in the lower right direction.

The slidable member 67 is provided such that the member 67 makes a contact with the shutter 63 at the side opposite from the side on which the toothed part 67b is formed. Further, in this part of the member 67, there is provided another toothed part 67c. The shutter 63, on the other hand, is provided on the magazine 46 rotatably about a pin 63a, and there is provided a toothed part 63b on a part thereof that makes contact with the slidable member 67. This toothed part 63b meshes with the toothed part 67c and the shutter 63 is rotated in response to the sliding movement of the member 67. When the member 67 is moved in the upper left direction in response to the counter clockwise rotation of the shutter 62, the shutter 63 is rotated in the clockwise direction and the opening 35a of the tank 35 is closed by the shutter 63. On the other hand, when the slidable member 67 is moved in the lower left direction, the shutter 63 is rotated in the counter clockwise direction and the opening 35a is exposed.

Thus, the opening and closing of the shutter 62 and the shutter 63 are made simultaneously and in synchronization by the movement of the pin 65 that in turn is caused by the opening and closing of the cover lid 48. Thereby, the spill of the toner in the toner supply tank 65 at the time of mounting a new magazine 46 or the spill of the toner in the toner recovery tank 36 at the time of removal of a used magazine 46 is effectively prevented by the present embodiment.

It should be noted that, in the present embodiment, the cleaning blade 22 is held on the recovery tank 36 by a compressional spring 22a. Thus, the blade 22 is gently urged upon the cleaning body 1 in correspondence to the drive roller 2c when the magazine 46 is mounted and the photosensitive belt 1 wrapped around the roller 2c is accepted into the opening 36a formed in the tank 36. Upon removal of the magazine 46, the blade 22 is slightly pushed forward by the spring 22a. However, the blade 22 does not obstruct the closing of the shutter 62. Thus, in the present embodiment, the cleaning blade 22 is replaced simultaneously to the magazine 46.

Further, the present invention is not limited to those embodiments described heretofore, but various variations and modifications may be made without departing from the scope of the invention.

What is claimed is:

1. A xerographic image recording apparatus for recording an image on a sheet, comprising:

a photosensitive body moved along a circuitous path, said photosensitive body forming thereon an electrostatic latent image upon irradiation of an optical beam;

electric discharging means provided at a part of the circuitous path of the photosensitive body for eliminating electric charges therefrom;

precharging means provided at a downstream side of the circuitous path in a moving direction of the photosensitive body with respect to the electric discharging means, for charging the photosensitive body electrically;

image writing means provided at a downstream side of the circuitous path in the moving direction of the photosensitive body with respect to the precharging means, for writing an image thereon by an optical beam to form an electrostatic latent image on the photosensitive body;

image developing means provided at a downstream side of the circuitous path in the moving direction of the photosensitive body with respect to the image writing means, said image developing means having an inlet for receiving a toner and coating the photosensitive body by the toner supplied thereto via the inlet, to form a toner image on the photosensitive body;

recording sheet feeding means for feeding a recording sheet along a sheet path such that a part of the sheet path coincides with the circuitous path of the photosensitive body at a downstream side of the photosensitive body with respect to the image developing means;

image transfer means provided at the part of the circuitous path of the photosensitive body that coincides with the sheet path, for transferring the toner image on the photosensitive body onto [a] *the* recording sheet passing through the sheet path;

cleaning means provided at the downstream side of the circuitous path of the photosensitive body with respect to the image transfer means for removing the toner remaining on the photosensitive body therefrom, after the transfer of image on the recording sheet;

a toner supply tank for accommodating a toner and for supplying the toner to the image developing means, said toner supply tank having a toner outlet for discharging the toner therefrom; and a toner recovery tank for collecting the toner removed by the cleaning means from the photosensitive body, said toner recovery tank having an inlet for receiving the toner supplied thereto;

said cleaning means, said toner supply tank and said toner recovery tank being assembled into a unitary body to form a detachable magazine *excluding said photosensitive body*, in said detachable magazine, said cleaning means being connected to said toner recover tank such that the toner removed from the photosensitive body by the cleaning means is received by said toner recovery tank via said inlet *of said toner recovery tank*, said toner recovery tank and said toner supply tank are assembled to share a compartment wall that separates the toner supply tank and the toner recovery tank from each other, said detachable magazine being mounted detachably on the xerographic image recording apparatus.

2. A xerographic image recording apparatus as claimed in claim 1 in which said detachable magazine comprises said toner supply tank and toner recovery tank arranged such that said toner supply tank is located adjacent to the toner recovery tank at a location immediately above the toner recovery tank, said detachable magazine being formed such that the toner supply tank is located above the image developing means when the detachable magazine is mounted on the recording apparatus, said toner supply tank having toner feeding means for transporting the toner therein to the outlet *thereof*, and said image developing means comprising duct means extending upwards from the inlet of the image developing means to the outlet of the toner supply tank when the detachable magazine is mounted on the recording apparatus, for transporting the toner therethrough, and toner feeding means for transporting the toner supplied to the inlet of the image developing means for distributing the toner uniformly in the image developing means.

3. A xerographic image recording apparatus as claimed in claim 2 in which said toner feeding means of the image developing means distributes the toner supplied [to the toner feeding means] *thereto* via the duct means in a direction substantially perpendicular to the direction of movement of the photosensitive body.

4. A xerographic image recording apparatus as claimed in claim 2 in which said xerographic image recording apparatus includes a body formed therein with a space for accommodating the photosensitive body, the electric discharging means, the precharging means, the image writing means, the image developing means, the recording sheet feeding means, the image transfer means, the cleaning means the toner supply tank, and the toner recovery tank, said space being surrounded by an inner wall of the body, and a rotatable cover lid member held rotatably with respect to the body of the xerographic image recording apparatus between a first state in which the cover lid member closes the space formed in the body of the xerographic image recording apparatus and a second state in which the cover lid member opens the space formed in the body of the xerographic image recording apparatus, said body being formed with guide means on the inner wall for guiding the detachable magazine when mounting the magazine on the image recording apparatus and when removing the magazine from the image recording apparatus.

5. A xerographic image recording apparatus as claimed in claim 4 in which said detachable magazine is disposed, when mounted on the image recording apparatus, at an upstream side of the electric discharging means, said toner supply tank having a toner transport mechanism for discharging the toner in the toner supply tank through the toner outlet, and said image developing means includes a first toner transport mechanism adapted to engage with the toner outlet of the toner supply tank when the detachable magazine is mounted on the image recording apparatus, said first toner transport mechanism of the image developing means extending to bridge across the electric discharging means, precharging means and the image writing means for feeding the toner discharged from the toner supply tank through the toner outlet to the image developing means, said image developing means further including a second toner transport mechanism for distributing the toner supplied by the first toner transport mechanism uniformly over the image developing means.

6. A xerographic image recording apparatus as claimed in claim 5 in which said second toner transport mechanism transports the toner in a direction generally perpendicular to the moving direction of the photosensitive body, along the photosensitive body.

7. A xerographic image recording apparatus as claimed in claim 1 in which said cleaning means includes a toner transport mechanism and a toner outlet, said toner transport mechanism transporting the toner removed from the photosensitive body to said toner outlet of the cleaning means, said detachable magazine being mounted on the image recording apparatus such that the toner supply tank is located above the image developing means for supplying the toner in the toner supply tank into the developing unit located underneath via the toner outlet of the toner supply tank and such that the toner recovery tank is located above the toner supply tank for collecting the toner removed by the cleaning means, said toner outlet of the cleaning means extending in a downward direction to the inlet of the toner recovery tank for feeding the toner removed from the photosensitive body therethrough by [the] gravity.

8. A xerographic image recording apparatus as claimed in claim 1 in which said image recording apparatus further includes a sensor on the image developing unit for detecting when to replace the detachable magazine by a new one.

9. A xerographic image recording apparatus as claimed in claim 8 in which said detachable magazine carries thereon a cleaning blade for removing the residual toner from the photosensitive body, said cleaning blade forming a part of the cleaning [unit] *means* and provided on the detachable magazine as a unitary body.

10. A xerographic image recording apparatus as claimed in claim 1 in which said detachable magazine is formed with an optical element as a part of the image writing means for focusing [the] *an* optical beam on the photosensitive body, said optical element being provided as a unitary body to the detachable magazine.

11. A xerographic image recording apparatus as claimed in claim 2 in which said toner supply tank and recovery tank have respective shutter mechanisms such that the shutter mechanism provided on the toner supply tank closes the toner outlet of the toner supply tank when the detachable magazine is disconnected from the image recording apparatus and such that the shutter mechanism provided on the toner recovery tank closes the toner inlet on the toner recovery tank when the detachable magazine is disconnected from the image recording apparatus.

12. A xerographic image recording apparatus as claimed in which 4 in which said toner supply tank and said toner recovery tank have respective shutter mechanisms such that the shutter mechanism provided on the toner supply tank closes the toner outlet of the toner supply tank when the detachable magazine is disconnected from the image recording apparatus and such that the shutter mechanism provided on the toner recover tank closes the toner inlet on the toner recovery tank when the detachable magazine is disconnected from the image recording apparatus, wherein said shutter mechanisms of the toner supply tanks and the toner recovery tank are closed in response to [the] opening of the cover lid member and are opened in response to [the] closure of the cover lid member.

13. A xerographic image recording apparatus as claimed in claim 4, wherein said guide means comprises a guide groove formed on the inner wall of the body and said detachable magazine has a side wall formed with a projection adapted to the accepted in the guide groove.

*14. A toner magazine for use in a xerographic image recording-apparatus for recording an image on a sheet, said recording apparatus including a photosensitive body, said toner magazine comprising a body and being detachably mountable to the xerographic image recording apparatus, said toner magazine further comprising:*

*a cleaning device mounted to said magazine body and positioned so as to remove toner from said photosensitive body when said toner magazine is mounted to said xerographic image recording apparatus;*

*a toner supply tank in said magazine body for accommodating a toner, said toner supply tank having a toner outlet for discharging a toner therefrom; and*

*a toner recovery tank in said body for collecting toner removed by said cleaning device from the photosensitive body, said toner recovery tank having an inlet for receiving the toner supplied thereto,*

*wherein said cleaning device is positioned relative to said toner recovery tank such that toner removed from the photosensitive body by said cleaning device is received by said toner recovery tank via said inlet, and wherein said magazine body is unitary such that said toner recovery tank and said toner supply tank share a compartment wall of said magazine body that separates said toner recovery tank and said toner supply tank from each other, the toner magazine excluding the photosensitive body.*

*15. A toner magazine as claimed in claim 14, wherein said toner magazine comprises said toner supply tank and said toner recovery tank arranged such that said toner supply tank is located adjacent to said toner recovery tank at a location immediately above said toner recovery tank when said toner magazine is mounted to said image recording apparatus.*

*16. The toner magazine as claimed in claim 14, wherein said toner supply tank further comprises a toner feeding device for feeding the toner therein to said toner outlet.*

*17. A toner magazine as claimed in claim 14, further comprising ledges projecting from said magazine body and cooperative with mating portions on said image recording apparatus for detachably mounting said magazine body to said image recording apparatus.*

*18. A toner magazine as claimed in claim 17, wherein said magazine body further includes handle means for grabbing upon removal of said toner magazine from said image recording apparatus.*

*19. A toner magazine as claimed in claim 15, wherein said toner outlet is provided on said toner supply tank such that said toner outlet faces in a downward direction when said toner magazine is mounted upon said image recording apparatus.*

*20. A toner magazine as claimed in claim 14, wherein each of said outlet and said inlet has a movable shutter.*

*21. A toner magazine as claimed in claim 20, wherein said movable shutter has an actuation member for moving said shutter, said actuation member being adapted for engagement with a part of said xerographic image recording apparatus when said toner magazine is mounted upon said xerographic image recording apparatus.*

*22. A xerographic image recording apparatus as claimed in claim 2, wherein said toner outlet is provided on said unitary body of said detachable magazine such that said toner outlet faces in a downward direction when said detachable magazine is mounted upon said xerographic image recording magazine.*

*23. A toner magazine for use in a xerographic image recording apparatus for recording an image on a sheet, said recording apparatus including a photosensitive body, said toner magazine comprising a magazine body and being detachably mountable to the xerographic image recording apparatus, said toner magazine further comprising:*

*a cleaning device mounted to said magazine body and positioned so as to remove toner from the photosensitive body when said toner magazine is mounted to said xerographic image recording apparatus;*

*a toner supply tank in said magazine body for accommodating a toner, said toner supply tank having a toner outlet for discharging a toner therefrom;*

*a toner feeding device provided in said toner supply tank for feeding the toner therein to said toner outlet;*

*a toner recovery tank in said magazine body for collecting a toner removed by said cleaning device from said photosensitive body, said toner recovery tank having an inlet for receiving the toner supplied thereto;*

*said toner supply tank and said toner recovery tank being connected with each other to form said magazine body;*

*wherein said cleaning device is positioned relative to said toner recovery tank such that toner removed from the photosensitive body by said cleaning device is received by said toner recovery tank via said inlet, the toner magazine excluding the photosensitive body.*

*24. A toner magazine as claimed in claim 23, further comprising ledges projecting from said magazine body and cooperative with mating portions on said image recording apparatus for detachably mounting said magazine body to said image recording apparatus.*

*25. A toner magazine as claimed in claim 23, wherein said magazine body further includes handle means for grabbing upon removal of said toner magazine from said image recording apparatus.*

*26. A toner magazine as claimed in claim 23, wherein each of said outlet and said inlet has a movable shutter.*

*27. A toner magazine as claimed in claim 23, wherein said toner supply tank and said toner recovery tank are connected to each other as a unitary body.*

*28. A toner magazine as claimed in claim 23, wherein said toner supply tank and said toner recovery tank are connected with each other with a mutual separation by a bridging structure.*

*29. A toner magazine as claimed in claim 28, wherein said bridging structure includes a passage for an optical beam used for writing an image on said photosensitive body of said xerographic image recording apparatus.*

* * * * *